United States Patent [19]

Kitahama et al.

[11] Patent Number: 5,181,307
[45] Date of Patent: Jan. 26, 1993

[54] METHOD AND APPARATUS FOR ASSEMBLING DOOR FOR MOTORCAR

[75] Inventors: Michihiro Kitahama; Akira Miyazaki, both of Sayama, Japan

[73] Assignee: Honda Giken Kogyo Kabushiki Kaisha, Tokyo, Japan

[21] Appl. No.: 646,037

[22] Filed: Jan. 28, 1991

[30] Foreign Application Priority Data

Feb. 15, 1990 [JP] Japan .................. 2-34740

[51] Int. Cl.$^5$ .............................. B23P 11/00
[52] U.S. Cl. ........................ 29/434; 29/468; 29/11
[58] Field of Search .............. 29/434, 466, 467, 468, 29/897.2, 11, 464, 469, 525.1

[56] References Cited

U.S. PATENT DOCUMENTS

| | | | |
|---|---|---|---|
| 4,617,712 | 10/1986 | Streett | 29/434 X |
| 4,768,277 | 9/1988 | Vogt et al. | 29/434 |
| 4,860,424 | 8/1989 | Kaibuki et al. | 29/434 |
| 4,861,099 | 8/1989 | Sasamura et al. | 29/434 X |

Primary Examiner—Timothy V. Eley
Assistant Examiner—C. Richard Martin
Attorney, Agent, or Firm—Armstrong, Westerman, Hattori, McLeland & Naughton

[57] ABSTRACT

A hinge bracket is fastened to a motorcar body while the looseness or play at a hinge portion of the hinge bracket is removed, the looseness being in a direction in which a door load is applied.

The apparatus for doing so includes a setting device for setting the door by moving a jig which holds the door, a fastening device for fastening a hinge bracket which is hingedly provided on the door to a motorcar body, and a play or looseness removing device for removing looseness at a hinge portion of a hinge bracket, the looseness being in a direction in which a door load is applied.

The play or looseness is removed by lifting the hinge bracket at an end on the side of the hinge portion and/or by lowering the hinge bracket at an end opposite to the hinge portion.

4 Claims, 7 Drawing Sheets

METHOD AND APPARATUS FOR ASSEMBLING DOOR FOR MOTORCAR

BACKGROUND OF THE INVENTION

This invention relates to a method of and an apparatus for setting a door to a motorcar body and fastening a hinge bracket which is hingedly mounted on the door to the motorcar body.

A conventionally known method and an apparatus for automatically assembling a door is disclosed in Japanese Published Unexamined Patent Application No. 240574/1985. A setting means comprising a robot having a jig mounted thereon for holding the door and a fastening means comprising a robot having a nut runner mounted thereon are used. The door is set to the motorcar body by the setting jig with the door being held on the jig, and then a hinge bracket is fastened to the motorcar body by the fastening means.

In the prior method, until the hinge bracket is fastened, the door is held in a predetermined setting position by the jig. However, when the jig is released from the door after the completion of the assembling, there are cases in which the door is displaced relative to the hinge bracket due to looseness (or play) in the hinge portion of the hinge bracket, resulting in a displacement of the door relative to the motorcar body.

OBJECT AND SUMMARY OF THE INVENTION

Considering the above-mentioned disadvantage, this invention has an object of providing a method and an apparatus in which the door can be assembled to the motorcar body such that the door is not displaced from the set position even if there is play or looseness in the hinge portion of the hinge bracket.

In order to attain the above object, according to the method of this invention, a hinge bracket is fastened to a motorcar body under a condition in which looseness at a hinge portion of the hinge bracket is removed, the looseness being in a direction in which a door load is applied.

In addition, the apparatus according to this invention comprises: setting means for setting the door by moving a jig which holds the door; fastening means for fastening a hinge bracket which is hingedly provided on the door to a motorcar body; and play or looseness removing means for removing looseness at a hinge portion of a hinge bracket, the looseness being in a direction in which a door load is applied.

Because the looseness at the hinge portion of the hinge bracket in the direction in which the door load is applied is removed, the door will not be displaced relative to the hinge bracket but will be held in a set position even if the door load is applied to the hinge bracket at the completion of assembling.

A vertical load due to the load of the door and a moment load about a horizontal axial line will be applied at the hinge portion of the hinge bracket. Here, if the hinge bracket is pushed up at an end on the side of the hinge portion, the door is prevented from moving downwards relative to the hinge bracket. In other words, the looseness to be caused by the vertical load is removed. When, on the other hand, the hinge bracket is pushed down at an end which is opposite to the hinge portion, the hinge bracket will be tilted by an amount equal to the looseness attributable to the moment load to be applied to the hinge portion. The door is thus prevented from tilting relative to the hinge bracket. In other words, the looseness to be caused by the moment load is removed.

When setting means having a jig for holding the door is provided, as in the apparatus of this invention, if the jig is provided with looseness removing means, the looseness removing means needs not be moved by a separate robot or the like to a position facing the hinge bracket, resulting in a reduction in equipment costs.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENT

Figure 1:
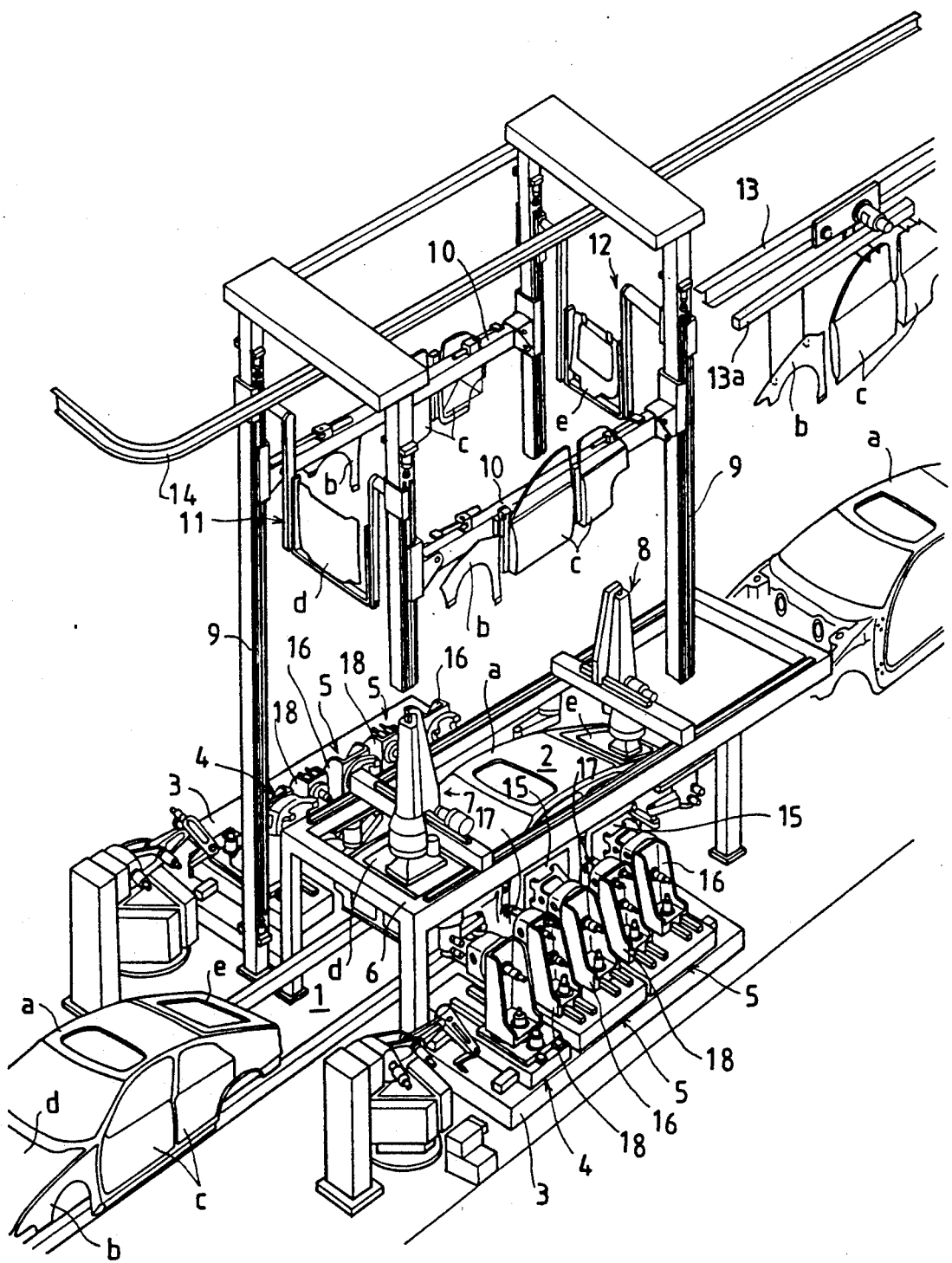
FIG. 1 is a perspective view of an assembling station equipped with the present invention.

With reference to FIG. 1, a conveying line for a motorcar body is provided with an assembling station 2. Assembling robots 4 for front fenders b and assembling apparatuses 5, 5 for each of the front and rear doors c are disposed on bases 3 which are provided on the right and left sides of the assembling station 2, in the order mentioned from the front end rearward. An overhead frame 6 is provided in the assembling station 2. An assembling robot 7 for a bonnet d and an assembling robot 8 for a trunk lid e are disposed on the overhead frame 6. An apparatus frame 9 which extends upwards above the overhead frame 6 and which supports thereon drop lifters is vertically provided in the assembling station 2. First drop lifters 10, 10 for the front fenders b and the front and rear doors c are provided in a vertically movable manner on both right and left sides of the apparatus frame 9. A second drop lifter 11 for the bonnet d and a third drop lifter 12 for the trunk lid e are provided in a vertically movable manner at, respectively, the front and rear of apparatus frame 9. The front fenders b and doors c conveyed by first hanger conveyors 13, which are arranged to pass along the right and left sides above the overhead frame 6 (conveyor of only on one side is shown in FIG. 1), are respectively handed over to the assembling robots 4 for the front fenders b and the assembling apparatuses 5 for the front and rear doors via the first drop lifters 10, 10. The bonnet d and the trunk lid e suspended by a hanger (not shown) of a second hanger conveyor 14, which is arranged to pass along an upper central portion of the assembling station 2, are handed over to the assembling robots 7, 8 for the bonnet and the trunk lid respectively via the second and third drop lifters 11, 12. The front fenders b, doors c, bonnet d and trunk lid e are assembled to the motorcar body a in a single assembling station 2.

Among the above, the assembling apparatuses 5 for the doors relate to this invention. Therefore, more detailed explanation is given below concerning the assembling apparatuses 5.

Each of the assembling apparatuses 5 comprises: a setting robot 16, as a setting means, on which a jig 15 for holding the door c is mounted; and a fastening robot 18, as a fastening means, on which nut runners 17 are mounted.

Figure 2:
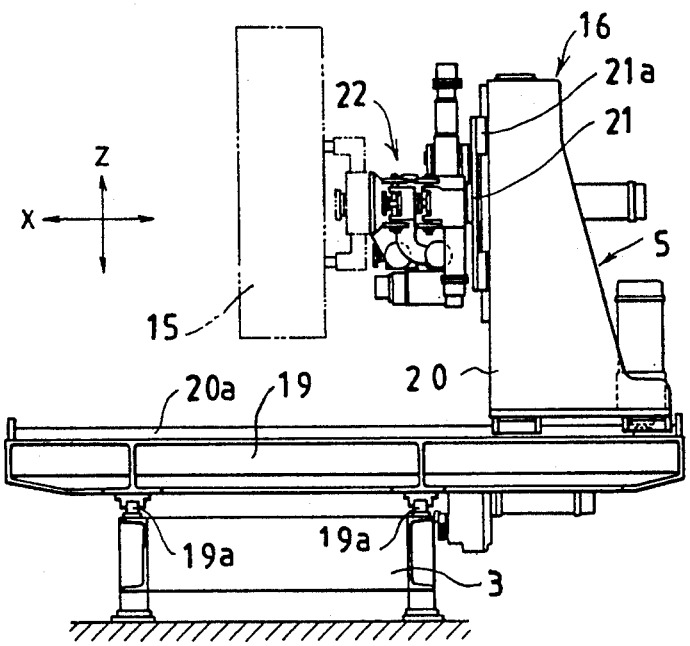
FIG. 2 is a side view of a setting robot for a door as seen from a forward end of the Y-axis direction.
Figure 4:
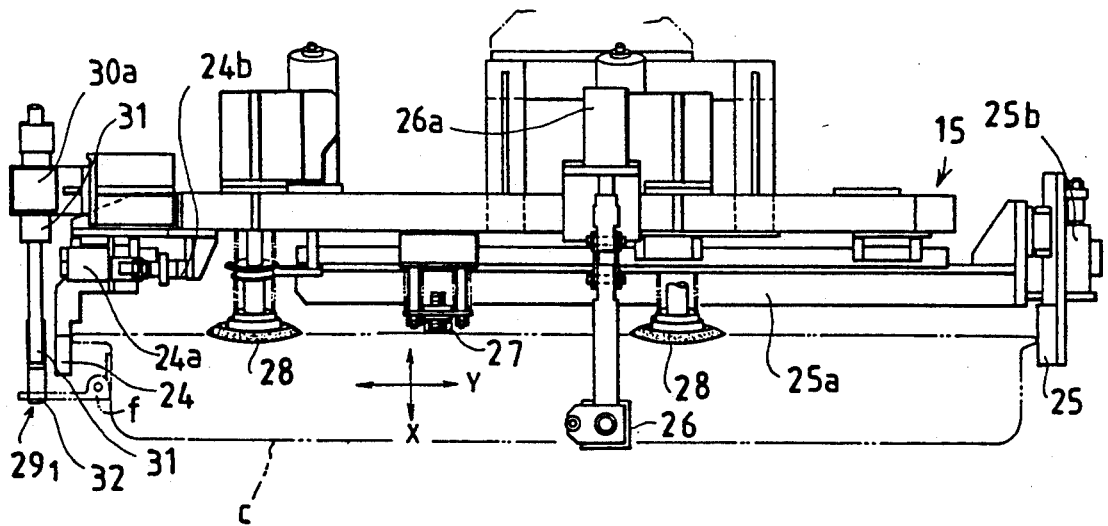
FIG. 4 is a plan view thereof.
Figure 3:
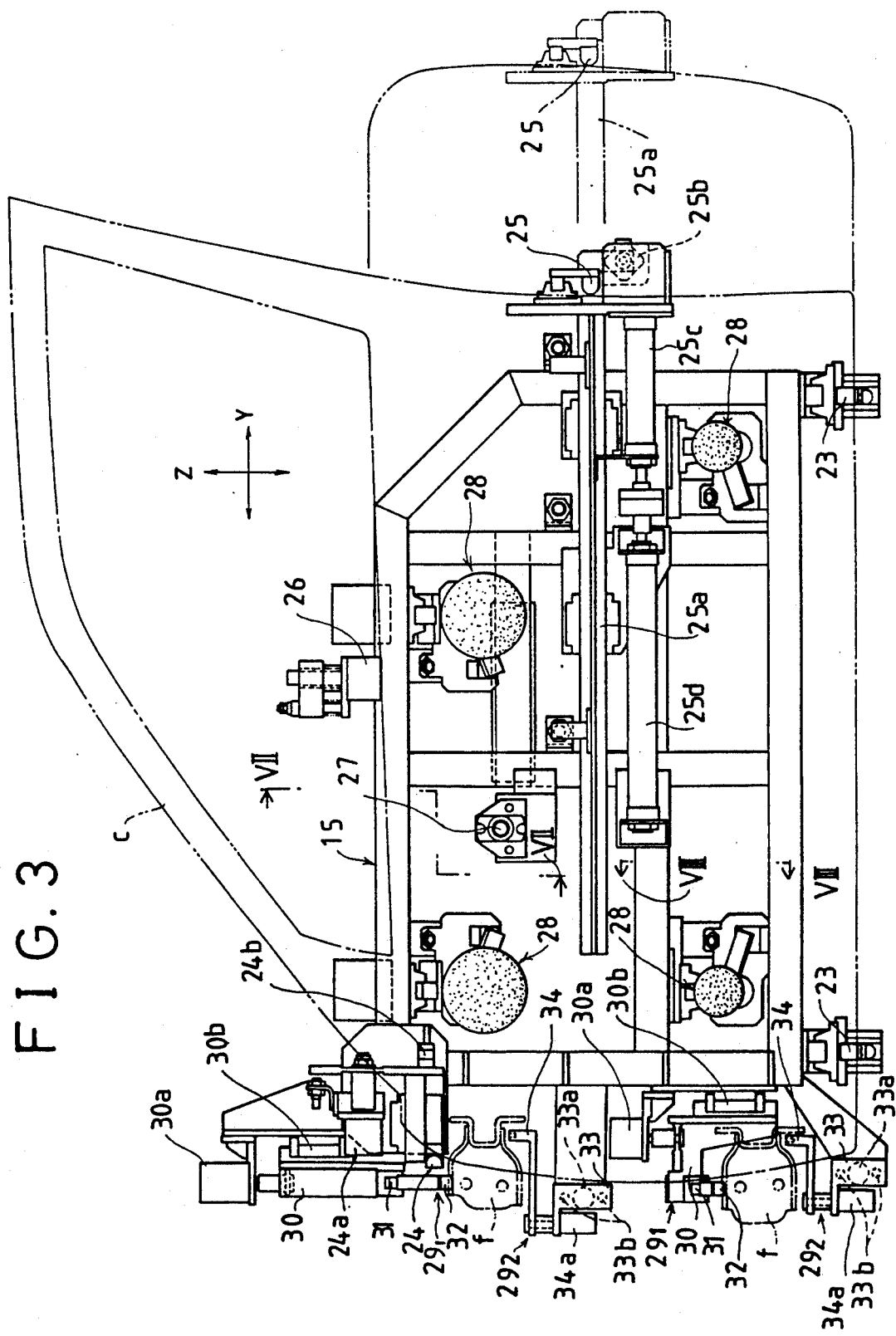
FIG. 3 is a front view of a jig as seen from an inside in the X-axis direction.
Figure 5:
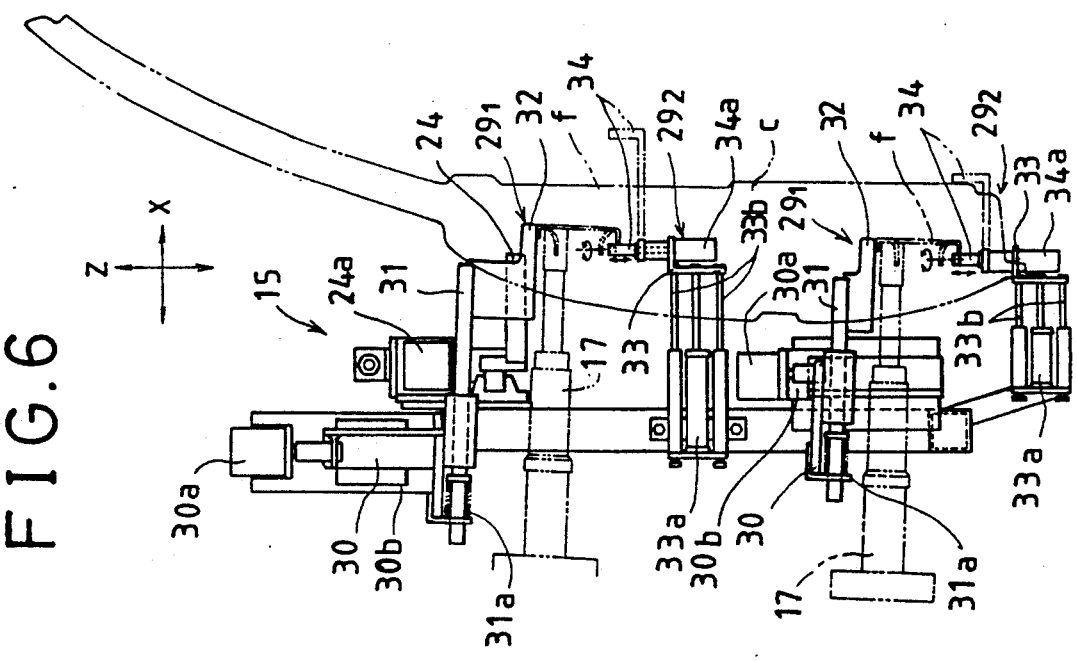
FIGS. 5 and 6 are a right side view and a left side view, respectively, of the jig as shown in FIG. 3.
Figure 6:
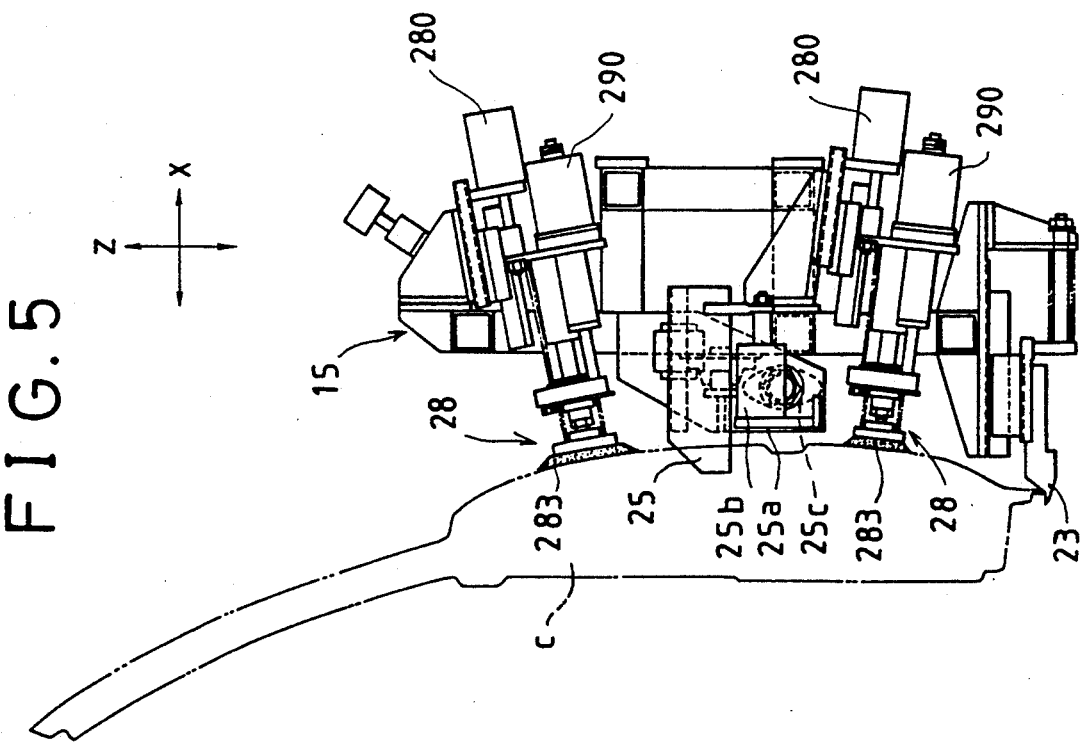

Each of the setting robots 16 comprises, as shown in FIG. 2: a first slide base 19 which is movable in the lengthwise direction of the motorcar (i.e., Y-axis direction) along guide rails 19a on the base 3; a second slide base 20 which is movable in the widthwise direction of the motorcar (i.e., X-axis direction) along guide rails 20a on the first slide base 19; and a lifting frame 21 which is lifted and lowered in the height-wise direction of the motorcar (i.e., Z-axis direction) along guide rails 21a provided on a side of the second slide base 20. The jig 15 is mounted on the lifting frame 21 via a wrist 22 of three-axis construction. After the doors c have been received from the first drop lifters 10 to the jigs 15, the positional correction in the Y-axis and Z-axis directions of the jig 15 as well as the tilting correction about the X-axis by means of the wrists 22 are performed according to correction data of the door setting position which is calculated on the basis of the position information of the motorcar body a, the position information being obtained by position sensors (not shown) which are provided in the assembling station 2. Under these conditions, the jigs 15 are advanced inward in the X-axis direction to set the doors c to the motorcar body a.

Figure 7:
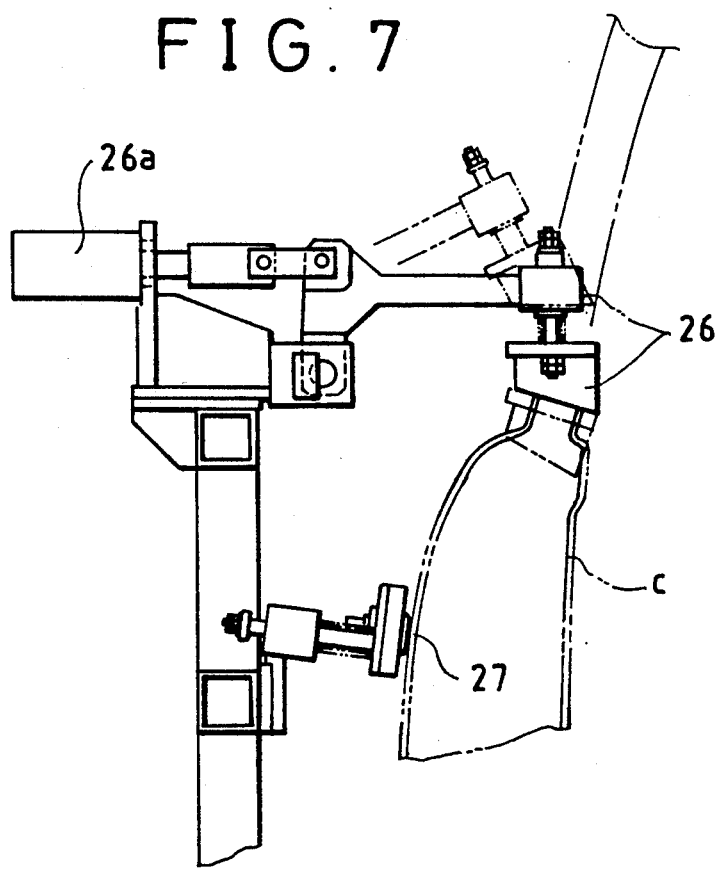
FIG. 7 is a sectional view taken along the line VII—VII of FIG. 3.

Each of the jigs 15 comprises, as shown in FIGS. 3 through 6: a pair of front and rear workpiece receiving members 23, 23 which are floatably mounted in the X-axis direction, for supporting a lower edge of the door c; a reference positioning member 24 which is movable by a cylinder 24a between a front clearing position and a reference position restricted by a stopper 24b, for supporting a front edge of the door c; a first clamping member 25 provided on a movable frame 25a, which is movable back and forth in the Y-axis direction, so as to be projected and retracted by a cylinder 25b in the X-axis direction, such that the door c can be pressed at its rear edge against the reference positioning member 24 by the operation of a clamping cylinder 25c which moves the movable frame 25a back and forth; a second clamping member 26 which is swung up and down by a cylinder 26a to press an upper edge of the body portion of the door c from above as shown in FIG. 7; a pad 27 which is floatably mounted in the X-axis direction for supporting an external surface of the door c; and a plurality of suction means 28 for holding an external surface of the door c by suction. In handing over the doors c from the first drop lifters 10, the jigs 15 are moved to an upwardly inclined posture by tilting the wrists 22 about the Y-axis. Each of the doors c is supported by the jig 15 by receiving it at its lower edge by the workpiece receiving member 23 and at its external surface by the pad 27. Then, the reference positioning member 24 is moved to a reference position. The first clamping member 25 is operated to fix the position of the door c in the Y-axis direction. The second clamping member 26 is operated to fix the position of the door c in the Z-axis direction. Finally, the door c is held by the suction means 28 for fixedly supporting the door c on the jig 15 Thereafter, the jig 15 is returned to the vertical posture, thus setting each of the doors c to the motorcar body a.

The first clamping member 25 is arranged, in order to cope with two-door type of motorcars, so that its position can be changed over between a position for two-door type motorcars and a position for four-door type motorcars, by sliding the movable frame 25a longitudinally by a model-switching cylinder 25d which is connected to the clamping cylinder 25c.

Figure 8:
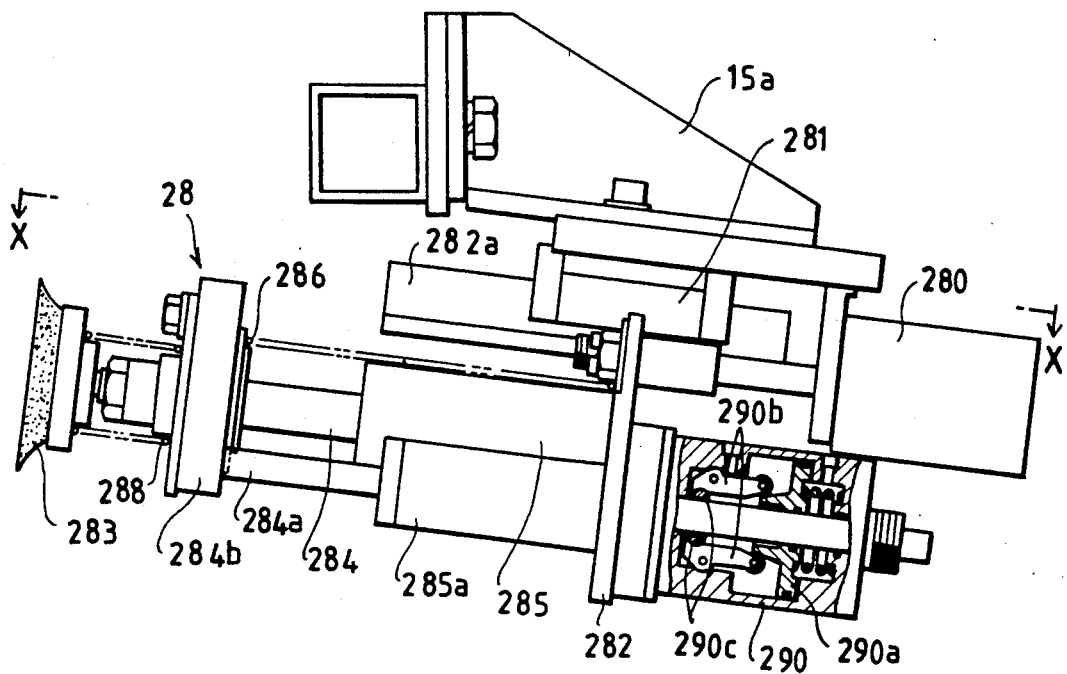
FIG. 8 is an enlarged side view of a suction means as seen from the line VIII—VII of FIG. 3.
Figure 10:
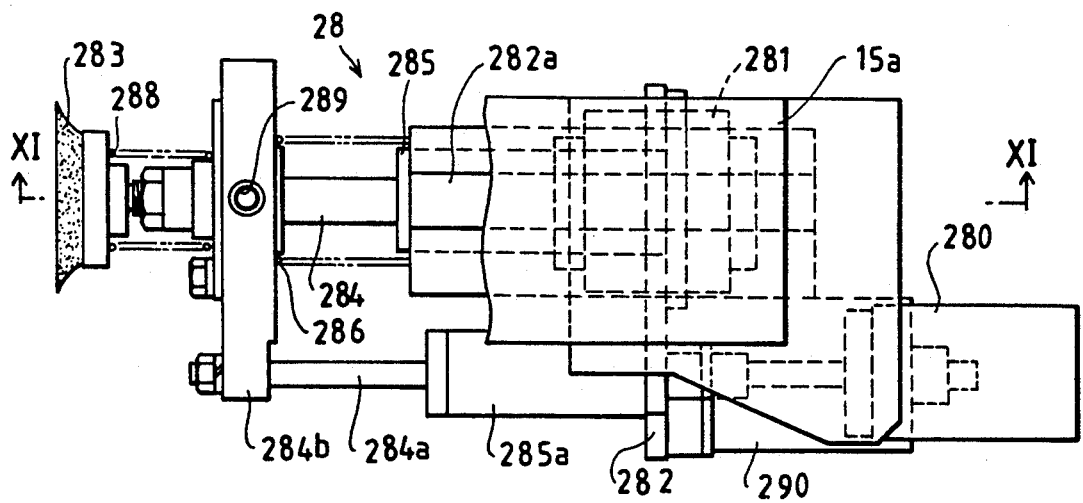
FIG. 10 is a sectional plan view taken along the line X-X of FIG. 8.
Figure 9:
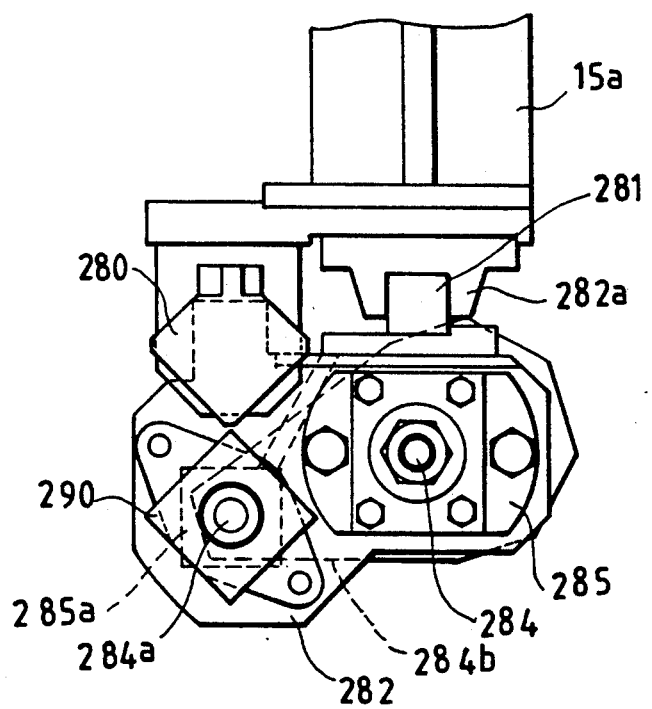
FIG. 9 is a right side view of the suction means shown in FIG. 8.
Figure 11:
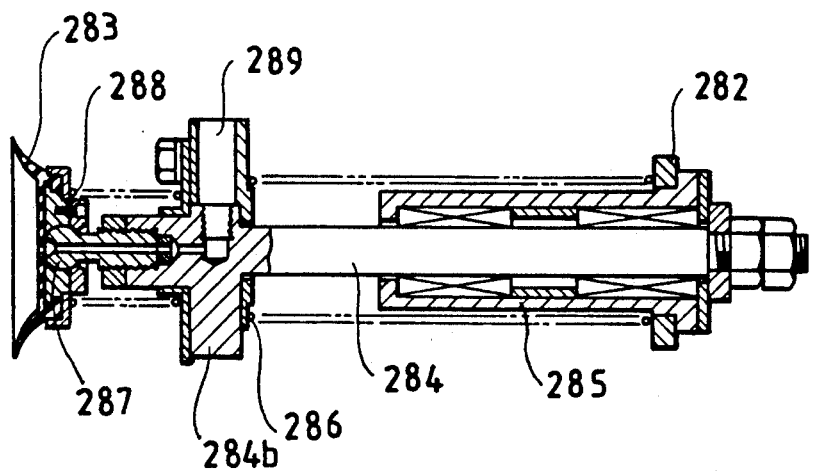
FIG. 11 is a sectional side view taken along the line XI—XI of FIG. 10.

Each of the suction means 28 is constructed as shown in FIGS. 8 through 10 Namely, a movable frame 282 is provided on a bracket 15a fixed to each of the jigs 15 and is moved back and forth by a cylinder 280 towards an external surface of the door, guided by a linear guide 281. A rod 284 having at its end a suction member 283 is supported on the movable frame 282 by being inserted, as shown in FIG. 11, through a guide sleeve 285 which is mounted on the movable frame 282. In this manner, the rod 284 is slidable in the direction of the forward and backward movements of the movable frame 282. A guide bar 284a in parallel with the rod 284 is attached to the rod 284 via a connecting plate 284b. The guide bar 284a is inserted through another guide sleeve 285a which is provided on the movable frame 282, thereby preventing the rod 284 from rotating. A spring 286 is interposed between the movable frame 282 and the connecting plate 284b to urge the rod 284 towards the door being assembled. A rail 282a is provided on the movable frame 282 which is engaged with the linear guide 281.

The suction member 283 is pivotally attached to an end of the rod 284 via a ball joint 287 and is resiliently held in a neutral posture by a spring 288 which is interposed between the suction member 283 and the connecting plate 284b. A passage 289 is provided for connecting a vacuum system (not shown) to the suction member 283.

The movable frame 282 is provided with a locking cylinder 290 through which the guide bar 284a is passed so that the guide bar 284a, in other words, the rod 284 may be locked at an arbitrary position. The locking cylinder 290 is a conventional one in which a brake shoe 290c is tightened via a brake arm 290b with an advance of a tapered brake piston 290a inside thereof. Therefore, detailed description thereof is omitted.

When each of the doors c is held by vacuum applied by the suction means 28, the movable frame 282 is first advanced laterally inward to urge the suction member 283 against an external surface of the door c. At this time, the rod 284 is moved backwards relative to the movable frame 282 due to a reaction force of the suction member 283 upon its contacting the door c, thereby relieving the shocks of contacting. When the movable frame 282 has been advanced to a predetermined position, the locking cylinder 290 is operated to lock the rod 284 at that position, and the door c is held by suction immovably in the X-axis direction.

The conventional suction means to be provided in the jig 15 is not provided with a locking means such as the above-mentioned locking cylinder 290 intended to restrict the sliding of the suction member 283. Therefore, the arrangement was such that a receiving member was fixedly provided on the jig 15 so as to support an external surface of the door, and that the door was retracted after attaching the external surface thereof by the suction member 283 so that the door may be positioned in the lateral direction by abutting the external surface thereof against the receiving member.

In this conventional arrangement, when the jig 15 is intended to serve plural kinds of doors, the shape of the receiving member must be made to conform to the maximum common external surfaces of the doors. As a result, the area of the door to abut the receiving member decreases and the door is more likely to be deformed.

In contrast thereto, according to this embodiment of the present invention, since the door c can be attached and held in position by the suction member 283, the receiving member as mentioned above is not required, and a suction means that can be universally usable without causing deformation of the door c can be obtained.

Figure 12:
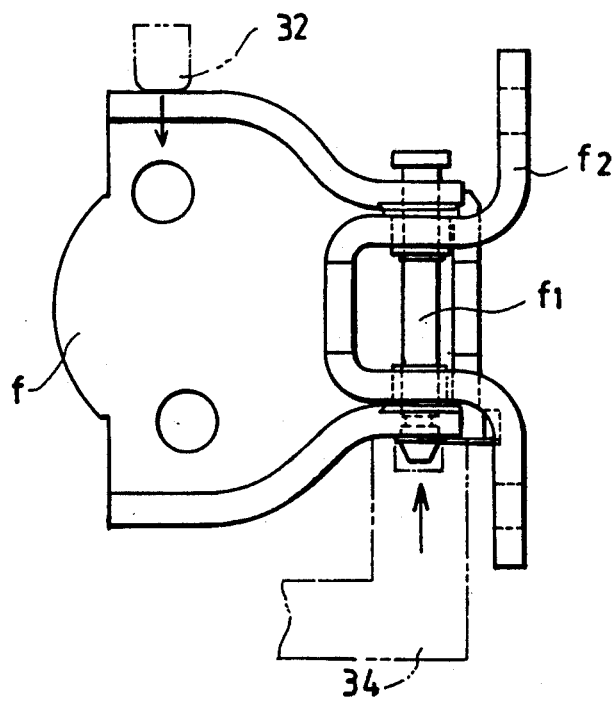
FIG. 12 is an enlarged view of a hinge bracket.

Each of the jigs 15 is provided with first and second looseness removing means $29_1$, $29_2$ for removing the looseness (or play) of a pair of upper and lower hinge brackets f, f which are hingedly mounted at a front portion of the door c. Each of the first looseness removing means $29_1$, comprises: a movable frame 30 which is provided at a front of the jig 15 so as to be movable up and down along a linear guide 30b by a cylinder 30a; a rod 31 which is supported by the movable frame 30 to be slidable in the X-axis direction and which is urged inward in the X-axis direction by a spring 31a; and a contact piece 32 which is provided at a front end of the rod 31 and which faces a hinge bracket f. As shown in FIG. 12, the contact piece 32 is made to abut an upper edge of that side of the bracket f which is opposite to the hinge portion $f_1$, i.e., the front end thereof, so that the front end thereof may be pushed downwards by a pushing force of the cylinder 30a.

Each of the second looseness removing means $29_2$ comprises: a movable frame 33 which is provided on the jig 15 so as to be movable back and forth in the X-axis direction by a cylinder 33a and guide bars 33b; and an arm 34 provided on the movable frame 33 for pushing, from underneath, the hinge portion $f_1$ located at a rear of the hinge bracket f, such that the arm 34 is movable up and down as well as rotatable about the Z-axis by an actuator 34a.

After the movable frame 33 has been advanced inward in the X-axis direction with the arm 34 directed towards the X-axis direction, the arm 34 is swung backwards in the Y-axis direction so that a front end of the arm 34 may be positioned right below the hinge portion $f_1$ of the hinge bracket f. Then, the arm 34 is moved up to push upwards the hinge portion $f_1$ so that the looseness in the vertical direction at the hinge portion $f_1$ may be removed.

The hinge portion $f_1$ of the hinge bracket f also has looseness in the diametrical direction. When the hinge bracket f is fastened to the motorcar body a, a clockwise moment load, as seen in FIG. 12, due to the weight of the door is applied to the hinge portion $f_1$. Consequently, the door c is tilted with the rear side thereof downwards due to the looseness in the diametrical direction of the hinge portion $f_1$. Here, if a fixing bracket $f_2$ for fixing the door c is considered to be the basis of comparison, the hinge bracket f can be regarded to be tilted counterclockwise relative to the fixing bracket $f_2$ by the amount of the looseness. Therefore, if the hinge bracket f is pushed down at its front portion by means of the first looseness removing means $29_1$, the hinge bracket f is tilted counterclockwise relative to the fixing bracket $f_2$ and, consequently, the looseness in the direction in which the moment load is applied is removed. When the hinge bracket f under these conditions is fastened to the motorcar body a by each of the nut runners 17 which are mounted on the fastening robot 18, the door c is maintained in a predetermined set position without tilting even if the jig 15 is released from the door c.

The contact piece 32 abuts the motorcar body a by the urging force of the spring 31a when the door c is set to the motorcar body and will keep urging the bracket f until the fastening of the hinge bracket f is completed.

The position in which the hinge bracket f rotates about the hinge portion $f_1$ may not be a predetermined position. Therefore, in fastening the hinge bracket f, it is so arranged that the hinge bracket f is pressed by press member (not shown) to lie on the mounting surface of the motorcar body a and, under these conditions, the fastening is performed with each of the nut runners 17.

It is desirable to set the force at which the hinge bracket f is pressed by the looseness removing means, to a value corresponding to the door load, preferably the door load inclusive of door fittings to be fitted to the door at latter steps.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of assembling a door for a motorcar comprising the steps of:
   aligning said door to a motorcar body;
   removing looseness at a hinge portion of a hinge bracket which is hingedly provided on said door, said looseness being in a direction in which a door load is applied, wherein the step of removing looseness includes the step of moving or bracing at least one of a first end of a side portion of the said hinge bracket and a second end of a side portion of said hinge bracket, said first end having a position nearer to said hinge portion than a position of said second end; and
   fastening said hinge bracket to said motor car body.

2. A method of assembling a door for a motorcar according to claim 1, wherein said step of removing looseness includes the step of lifting said hinge bracket at said first end of a side portion thereof.

3. A method of assembling a door for a motorcar according to claim 1, wherein said step of removing looseness includes the step of lowering said hinge bracket at said second end of a side portion thereof.

4. A method of assembling a door for a motorcar according to claim 1, wherein said step of removing looseness includes the step lifting said hinge bracket at said first end of a side portion thereof and the step of lowering said hinge bracket at said second end of a side portion thereof.

* * * * *